No. 853,160. PATENTED MAY 7, 1907.
C. N. CASS.
DISK HARROW.
APPLICATION FILED NOV. 6, 1906.
2 SHEETS—SHEET 1.
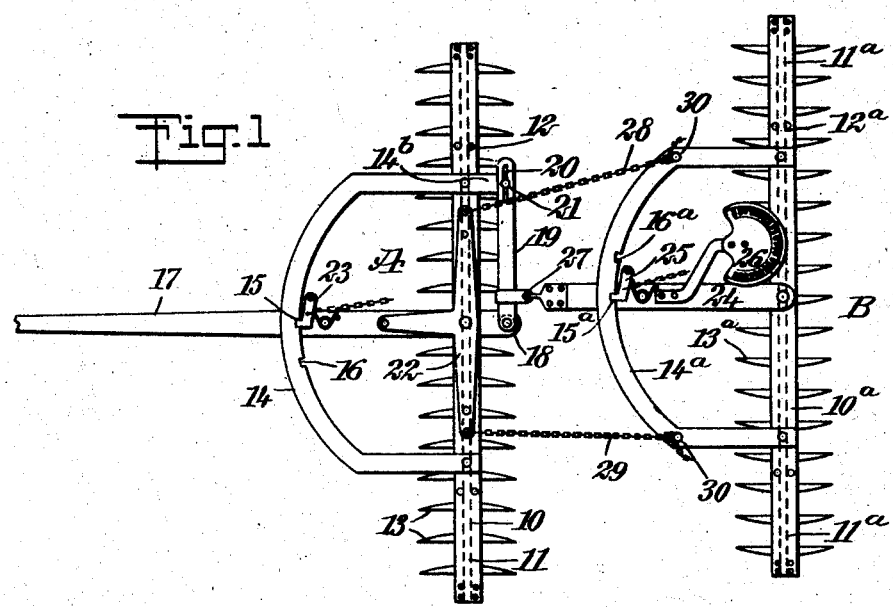
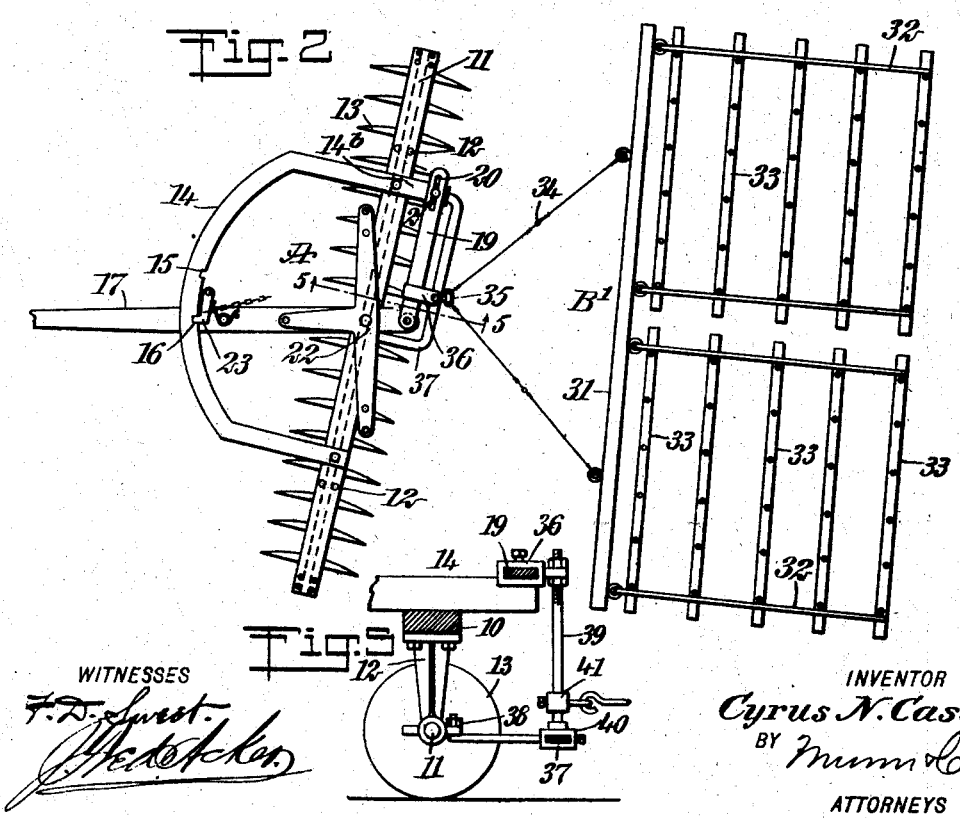
WITNESSES
INVENTOR
Cyrus N. Cass
BY
ATTORNEYS No. 853,160. PATENTED MAY 7, 1907.
C. N. CASS.
DISK HARROW.
APPLICATION FILED NOV. 6, 1906.
2 SHEETS—SHEET 2.
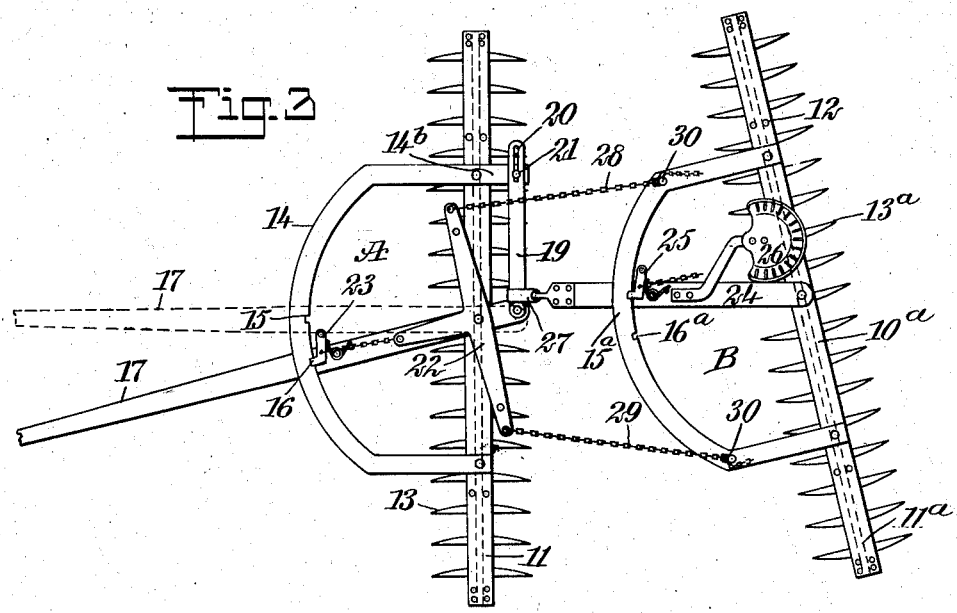
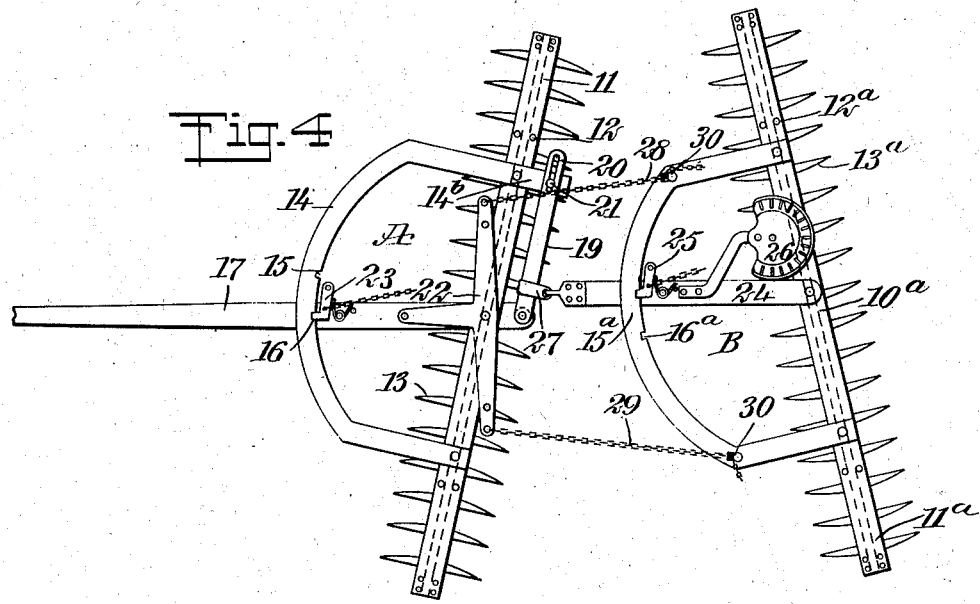
WITNESSES
F. D. Swert
INVENTOR
Cyrus N. Cass
BY Munn & Co
ATTORNEYS

UNITED STATES PATENT OFFICE.

CYRUS NEWELL CASS, OF SPANGLE, WASHINGTON.

DISK HARROW.

No. 853,160.

Specification of Letters Patent.

Patented May 7, 1907.

Application filed November 6, 1906. Serial No. 342,209.

*To all whom it may concern:*

Be it known that I, CYRUS NEWELL CASS, a citizen of the United States, and a resident of Spangle, in the county of Spokane and State of Washington, have invented a new and Improved Disk Harrow, of which the following is a full, clear, and exact description.

The purpose of the invention is to construct a disk harrow or similar implement in two sections, a forward and a rear section, and providing means whereby the sections can be adjusted independently or relatively to each other and held in adjusted position, the parts being released for adjustment by the driver but the actual adjustment being performed by the team.

A further purpose of the invention is to provide a simple, durable and economic construction that will enable the tooth or disk carrying members of each section to be brought into parallelism for the purpose of traveling to and from the field, or placed at acute angles to each other to accomplish the best results in working the ground, the draft being central in both cases, and also exceedingly light.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a plan view of the implement, the parts being in position for traveling to and from the field, both sections of the implement being shown provided with disk cutters; Fig. 2 is a plan view of the implement illustrating the two sections in working position, one section having disk cutters and the other being provided with teeth; Fig. 3 is a plan view of an implement of the kind shown in Fig. 1, illustrating the first step for the adjustment of the implement from the position illustrated in said Fig. 1; Fig. 4 is a plan view of the implement of the type shown in Figs. 1 and 2, and illustrating the parts thereof in working position; and Fig. 5 is a detail sectional view taken practically on the line 5—5 of Fig. 2.

The implement is made in two sections, a forward section A and a rear section B, which sections are coupled together in a removable manner. In the construction shown in Figs. 1, 3 and 4 the disk cutters are employed in both sections. In the construction of the forward section A a body beam 10 is employed, from which an axle 11 is supported by means of suitable hangers 12, the upper ends only whereof are shown, and disk cutters 13 are mounted upon said axle, being spaced apart in any approved manner. An arched bar 14 is secured to the body beam 10, the side members of said frame being at equal distances from the center of said beam; and the right-hand limb 14ª of the arched frame is made to extend beyond the rear edge of the body beam 10. An arched frame 14 is provided with a recess 15 at the central portion of the inner edge of its forward or bowed member, and with a second recess or notch 16 to the left of the central recess 15. A tongue or pole 17 is pivoted to the central portion of the body beam 10, the rear end 18 of which pole or beam extends about the same distance to the rear of the beam 10 as does the aforesaid limb 14ª of the arched frame 14; but the pole or tongue 17 is independent of the said arched frame 14.

A guide bar 19 is pivoted to the rear portion of the pole or tongue 17 and is adjustable upon the rear extended portion of the arched frame 14, the outer end of said guide bar, which engages with said limb 14ª of the frame, being provided with a slot 20, which receives a pin 21 passed into the said frame, whereby as the tongue 17 is moved upon its pivot the guide bar 19 is capable of corresponding movement. A cross bar 22 is secured to the said tongue, extending an equal distance beyond each side thereof, the center of said cross bar being the pivot point of the tongue. The tongue is made to carry a spring-controlled latch 23, and said latch is adapted to enter either one of the recesses 15 or 16 of the arched frame 14.

The rear section B also consists of a body beam 10ª, an axle 11ª supported by suitable bearings 12ª and disk cutters 13ª mounted on said axle; and said body bar 10ª is also provided with an attached arched frame 14ª, sustaining the same relation to the body beam or bar 10ª as does the arched frame 14 to the forward body beam 10. The forward or curved portion of the arched frame 14ª is provided with a central recess 15ª in its inner edge, and with a recess 16ª corresponding to the recess 16 of the forward section; but the recess 16ª is to the right of the central recess 15ª instead of to the left as in the front section. A reach 24 is centrally pivoted to the said rear body beam 10ª, and said reach carries a spring-controlled latch 25, corresponding to the forward latch 23 and adapted to enter either of the recesses 15ª or 16ª; and the reach 24 also supports the driver's seat 26, to which, or to a point within easy reach of the seat, chains or links are carried from the latches 23 and 25, enabling the driver to operate either one or both, as may be necessary.

A slide 27 is hinged or pivotally attached to the forward end of the reach 24, and said slide 27 is adapted to travel freely on the guide bar 19. Chains 28 and 29 are attached to the ends of the cross bar 22, carried by the pole or tongue 17, and these chains extend rearward and are adjustably attached to keepers 30 of any approved type, located at the forward end portions of the side members of the rear arched frame 14ª.

In Fig. 2 the rear section B' consists of a toothed harrow, in which construction a front beam 31 is provided and bars 32 extend from the rear edge of said beam 31, being hinged thereto. The bars are preferably four in number, each pair of pivoted bars being connected by a series of tooth-carrying bars 33, so that the rear section B' is constructed of two sub-sections. Links 34 are secured to the beam 31 at equal distances from its center, and said links are connected with an eye 35, which eye is in its turn connected with a slide 36, adapted to travel upon the guide bar 19 of the front section. I desire it to be understood, however, that any equivalent of the rear harrow section B' may be attached to the forward section A, without departing from the spirit of the invention.

In operation, when the machine is to be adjusted from its arrangement for transportation shown in Fig. 1 to an arrangement for service in the field as shown in Fig. 4, the right-hand chain 28 is tightened up, the latches 23 and 25 are withdrawn from engagement with the arched frames 14 and 14ª and the team is turned to the left, whereupon the position of the parts will be that shown by full lines in Fig. 3. Then the team is turned to the right until the pole or tongue 17 is again centrally placed and in consequence the two sections A and B of the harrow will be brought at an acute angle to each other, converging at the right-hand side of the implement and diverging at the left-hand side, as is shown in Fig. 4. Upon leaving the field the team is turned to the right, the latches having been disengaged from the arched frames of the sections, and the said latches are then permitted to enter the central notch 15 of the forward section A and the central notch 15ª in the arched frame of the rear section as is shown in Fig. 1, the chain 28 having been previously loosened. But it will be understood that any desired number of notches or recesses may be produced in the arched frames for the reception of the latches, and that the body beams of the two sections A and B may be made to converge at the left-hand side of the implement instead of at the right-hand side if so desired.

In Figs. 2 and 5 I have illustrated a construction whereby a low draft implement may be attached to the section A, and wherein an arched U-frame 37 is secured to the axle 11, at its ends, as is shown at 38 in Fig. 5, and a draft bar 39 is secured to the slide 36, and said bar has an attached slide 40 at its lower end mounted upon the U-frame 37. A sleeve 41 is adjustably mounted upon the draft bar 39, being held in position by a set screw or its equivalent, and the connecting medium for the attachment is received by said sleeve.

Having thus described my invention, I claim as new, and desire to secure by Letters Patent,—

1. A harrow constructed with a forward and with a rear section, the forward section being provided with a pivoted pole and the rear section provided with a reach, a sliding connection between the reach and the pole, and locking devices for the pole and forward section and the reach and the rear section.

2. A harrow provided with a forward section and a rear section a pivotal sliding connection between the central portions of the two sections, adjustable flexible connections between the sections at each side of their centers, and means for locking the sections in parallelism or at angles to each other.

3. A harrow provided with a forward section and a rear section, each section having a forwardly extending arched frame connected with its body portion, the forward section being provided also with a pivoted pole and the rear section with a pivoted reach, a sliding pivotal connection between the reach of the rear section and the pole of the forward section, flexible connections between an extension from the pole and the side members of the arched frame of the rear section, and means for locking the arched frame of the forward section to the pole, and means for locking the arched frame of the rear section to the reach.

4. In harrows, a forward and a rear section, arched bars extending forwardly from the body portions of said sections, a pole pivoted to the central portion of the body of the forward section, which pole extends rearward beyond the section and is provided at its rear end with arms extending beyond its sides, a guide bar connected with the rear end of the pole and the rear end of one of the side members of the arched frame of the forward section, a reach pivoted to the rear section, a pivotal and sliding connection between the reach and the said guide bar, flexible connections between the extension members of the pole and the side portions of the arched frame of the section, a latch carried by the reach, for engagement with the arched frame of the rear section, and a latch carried by the pole, adapted for engagement with the arched frame of the forward section of the implement.

In testimony whereof I have signed my name to this specification in the presence of two subscribing witnesses.

CYRUS NEWELL CASS.

Witnesses:
N. GRANT ELLEDGE,
HORACE E. HALL.